United States Patent
Sawada

(10) Patent No.: US 7,430,443 B2
(45) Date of Patent: Sep. 30, 2008

(54) PORTABLE COMMUNICATION TERMINAL

(75) Inventor: Akinobu Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 5 days.

(21) Appl. No.: 10/954,234

(22) Filed: Oct. 1, 2004

(65) Prior Publication Data

US 2005/0107141 A1 May 19, 2005

(30) Foreign Application Priority Data

Oct. 2, 2003 (JP) .............................. 2003-343989

(51) Int. Cl.
*H04M 1/00* (2006.01)
*G06K 9/36* (2006.01)
*G06K 9/46* (2006.01)
*H04N 5/225* (2006.01)
*H04N 9/04* (2006.01)

(52) U.S. Cl. ................. 455/575.3; 455/556.1; 455/566; 382/232; 348/207.99

(58) Field of Classification Search ............. 455/575.3, 455/556.1, 566, 556
See application file for complete search history.

(56) References Cited

U.S. PATENT DOCUMENTS

| 5,893,037 | A * | 4/1999 | Reele et al. .............. 455/556.1 |
| 6,687,496 | B1 * | 2/2004 | Nangle ...................... 455/419 |
| 6,731,952 | B2 * | 5/2004 | Schaeffer et al. ............ 455/557 |
| 6,792,148 | B1 * | 9/2004 | Wergeland et al. .......... 382/232 |
| 6,803,963 | B2 * | 10/2004 | Yamazaki et al. ........ 455/556.1 |
| 6,882,860 | B1 * | 4/2005 | Kim ........................ 455/553.1 |
| 2001/0034222 | A1 * | 10/2001 | Roustaei et al. ............. 455/403 |
| 2002/0067923 | A1 * | 6/2002 | Fujimura .................... 396/429 |
| 2004/0058714 | A1 | 3/2004 | Sawamura |
| 2005/0146608 | A1 * | 7/2005 | Yosida et al. ............ 348/207.1 |

FOREIGN PATENT DOCUMENTS

| JP | 2001-223774 | 8/2001 |
| JP | 2001-268411 | 9/2001 |
| JP | 2002-077701 | 3/2002 |
| JP | A-2003-198676 | 7/2003 |
| JP | 2003-244315 | 8/2003 |

* cited by examiner

*Primary Examiner*—Matthew Anderson
*Assistant Examiner*—Wen W Huang
(74) *Attorney, Agent, or Firm*—Morgan, Lewis & Bockius LLP

(57) ABSTRACT

In the upper enclosure, a CPU for application and a memory for application as well as an application device are mounted. In the lower enclosure, a CPU for communication and a memory for communication as well as a transmission/reception circuit are mounted. In such a configuration, the data transfer for application processing is executed mainly in the upper enclosure. Thus, the quantity of data passing through the folding portion from/to the lower enclosure for the application processing is reduced. The wire harness is simplified and power consumption is reduced.

7 Claims, 2 Drawing Sheets

PORTABLE COMMUNICATION TERMINAL

This application claims foreign priority based on Japanese patent application JP 2003-343989, filed on Oct. 2, 2003, the contents of which is incorporated herein by reference in its entirety.

BACKGROUND OF THE INVENTION

1. Field of the Invention

The present invention relates to a portable communication terminal such as a foldable cellular phone having a function device (application device) such as a display unit and capable of implementing various functions.

2. Description of the Related Art

FIGS. 2A and 2B are views showing the appearance of a foldable cellular phone. FIG. 2A shows an opened state; and FIG. 2B shows a folded state. The cellular phone includes an upper enclosure 20 in which an LCD (liquid crystal display) panel, a camera, etc. are mounted, a lower enclosure 10 in which a transmission/reception circuit, a CPU, etc. are mounted, and a folding portion 30 for foldably coupling these enclosures.

The upper enclosure 20 includes, on its inner side, a main LCD panel 2 which can be seen when opened. The upper enclosure 20 also includes, on its outer side, an antenna 1, a high sensitivity mobile camera 3, a positioning mirror 4 serving as a standard of a display range of an image, an LED (light emitting diode) 5, a subsidiary LCD panel 6. The LED 5 displays e.g. calling information. The subsidiary LCD panel 6 displays telephone calling or mail reception, date, time, etc. The lower enclosure 10 includes a key operation portion 9.

In the foldable cellular phone as shown in FIG. 2, a wireless portion (transmission/reception circuit) for transmission/reception, a CPU for control execution, a memory such as a ROM and RAM are generally provided in the lower enclosure 10. The CPU controls the display unit such as the main LCD panel 2 and camera provided in the upper enclosure 20 (see: JP-A-2003-198676).

In such a foldable cellular phone equipped with a camera, between the upper enclosure 20 and the lower enclosure 10, signal wires between the camera and the CPU or memory are provided in addition to the signal wires between the display unit and CPU or memory. The cellular phone, therefore, presented a structural problem that the wire harness at the folding portion 30 is bulky.

Further, the image picked up by the camera is monitored on the display unit. For this purpose, the image must be updated at a high-speed rate (e.g. 15 frames/sec) to a certain degree. The camera has e.g. three and several thousands of pixels. The image is displayed in full color on the display screen of the display unit having a size of 176 dots (width)×220 dots (length). Thus, a large quantity of data is required for a camera image.

In a case where a game function is added to the foldable cellular phone, the CPU located in the lower enclosure 10 processes the data for the game function, and the display unit in the upper enclosure 20 displays the image as the processing result. A large quantity of data is also required for implementing the gate function.

In this way, in order to process a huge quantity of data required for a function device (application device) such as the camera and game, the huge quantity of high speed signals (clocks, image data) pass through the wire harness of the folding portion 30. This presented a problem of an increase in power consumption owing to the capacitive load of the wire harness.

SUMMARY OF THE INVENTION

In view of the above circumstance, an object of the present invention is to provide a portable communication terminal capable of implementing the function such as a camera and a game, which can reduce the number of signal wires connecting an upper enclosure (first enclosure) and a lower enclosure (second enclosure) thereby simplifying the wire harness of a coupling portion such as a folding portion and a revolving portion, and to reduce the quantity of communication between the upper enclosure and the lower enclosure thereby reducing power consumption.

The portable communication terminal according to a first aspect of the present invention is a portable communication terminal comprising;

a first enclosure including a function device for processing an image data, a first CPU for controlling the function device, and a first memory controlled by the first CPU; and a second enclosure being mechanically and electrically connected to the first enclosure, the second enclosure including a transmission/reception circuit for performing communication between the terminal and the outside, a second CPU for controlling the transmission/reception circuit, and a second memory controlled by the second CPU.

The portable communication terminal according to a second aspect of the present invention is a portable communication terminal according to the first aspect of the present invention, further comprising:

a coupling portion for coupling the first enclosure and the second enclosure mechanically and electrically.

In the portable communication terminal, the image data may be subject to image compression processing before data transmission/reception containing the image data is carried out between the first enclosure and the second enclosure.

Further, when the communication is carried out between the terminal and the outside, data transmission/reception containing the image data may be enabled between the first enclosure and the second enclosure.

The portable communication terminal according to a third aspect of the present invention is a portable communication terminal according to the first or second aspect of the present invention, characterized in that the function device includes a camera module and a display module.

The portable communication terminal according to a fourth aspect of the present invention is a portable communication terminal according to any one of the first to third aspects of the present invention, characterized in that the first enclosure and the second enclosure are foldably coupled with each other at a folding portion.

The portable communication terminal according to a fifth aspect of the present invention is a portable communication terminal according to any one of the first to fourth aspects of the present invention, characterized in that in the first enclosure, the function device, the first CPU and the first memory are coupled with one another through a first bus line;

in the second enclosure, the second CPU and the second memory are coupled with each other through a second bus line;

data transmission/reception between the first enclosure and the second enclosure is carried out between the first bus line and the second bus line through an input/output interface.

The portable communication terminal according to a sixth aspect of the present invention is a portable communication terminal according to any one of the first to fourth aspects of the present invention, characterized in that the first enclosure includes a media processor for serving a partial function including an image processing function of the first CPU.

The portable communication terminal according to a seventh aspect of the present invention is a portable communication terminal according to the sixth aspect of the present invention, characterized in that in the first enclosure, the function device, the first CPU, the media processor and the first memory are coupled with one another through the first bus line;

in the second enclosure, the second CPU and the second memory are coupled with each other through the second bus line;

data transmission/reception between the first enclosure and the second enclosure is carried out between the first bus line and the second bus line through an input/output interface.

In accordance with the present invention, the first enclosure (upper enclosure) includes a first CPU for an application and a first memory for the application as well as a function device (application device), and the second enclosure (lower enclosure) includes a second CPU for communication and a second memory for communication as well as a transmission/reception circuit. Therefore, the data transfer in application processing is mainly carried out in the first enclosure. For this reason, as regards the application processing, the quantity of communication between the first enclosure and the second enclosure can be reduced.

Further, as regards the application processing, the width of the bus line (number of signal wires) connecting the first enclosure and the second enclosure is not almost a bottleneck, so that a large quantity of communication can be executed at a high speed in the first enclosure and the second enclosure. This facilitates the structure of a system for the application processing.

Further, since the quantity of communication between the first enclosure and the second enclosure is reduced, the width of the bus line (number of signal wires) connecting them is decreased, thereby downsizing the wire harness at the coupling portion such as the folding portion. This permits the production cost of the terminal to be reduced. Since the quantity of communication between the first enclosure and the second enclosure is reduced, the quantity of data passing the wire harness at a high speed at the coupling portion such as the folding portion is reduced, thereby reducing the power consumption owing to the capacitive load. The reduction in the number of the signal wires and power consumption is a great advantage for the portable communication terminal.

DETAILED DESCRIPTION OF THE INVENTION

Figure 1:
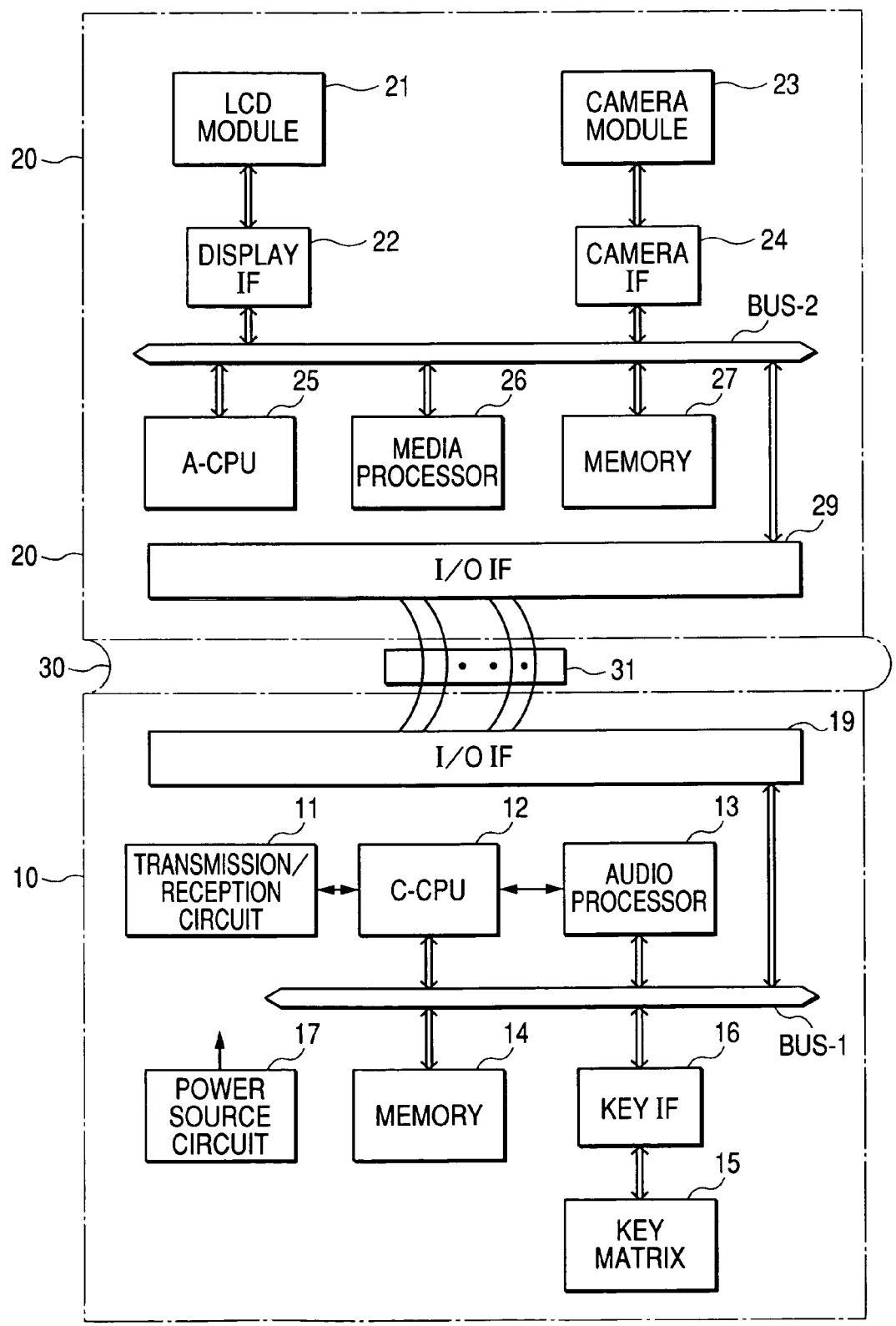
FIG. 1 is a view showing the configuration of a cellular telephone according to an embodiment of the present invention.

Now referring to the drawings, an explanation will be given of an embodiment of the portable communication terminal according to the present invention taking as an example a foldable cellular telephone. It should be noted that the present invention can be also applied to the other portable communication terminals than the foldable cellular telephone.

Figure 2A:
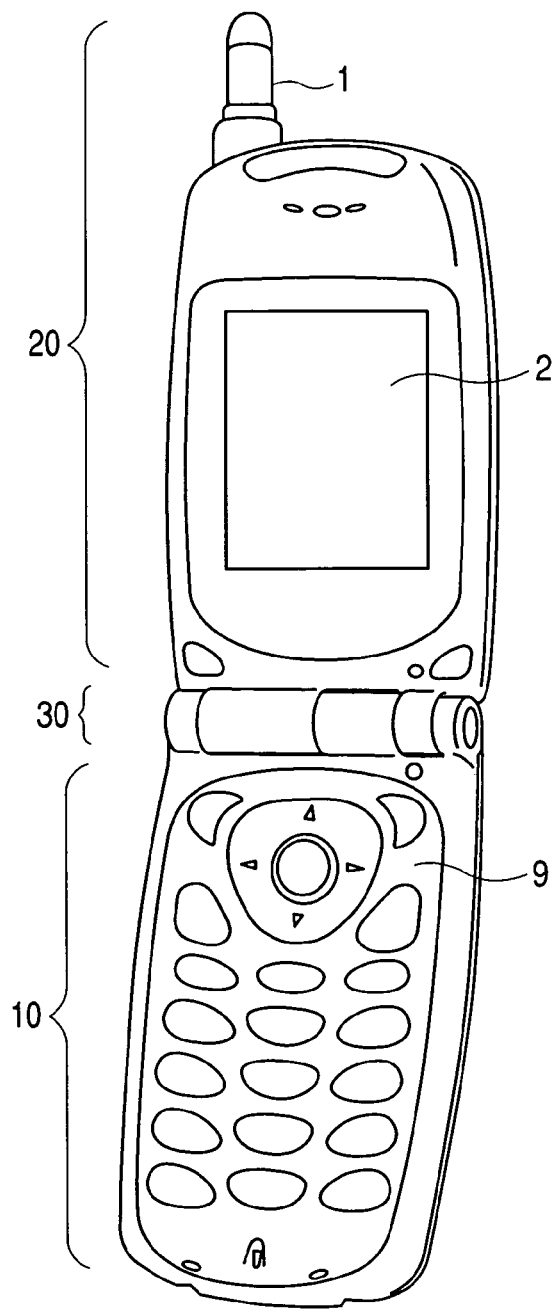
FIG. 2 is a view showing the appearance of a general foldable cellular telephone.
Figure 2B:
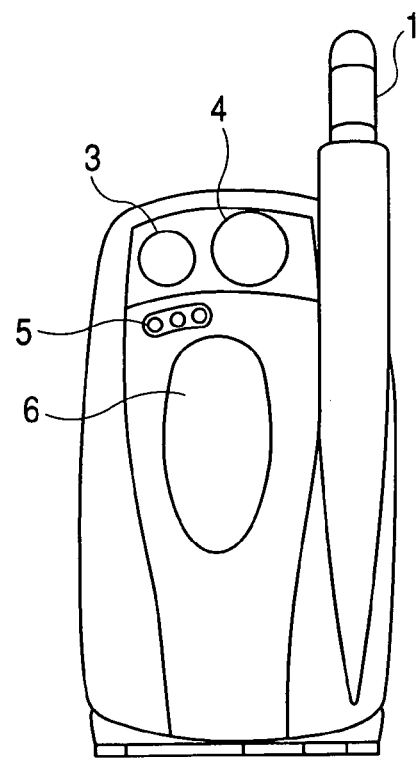

FIG. 1 is a view showing the configuration of the cellular telephone according to an embodiment of the present invention. As seen from FIG. 1, the cellular telephone includes an upper enclosure 20 which is a first enclosure, a lower enclosure 10 which is a second enclosure and a folding portion 30 which is a coupling portion for foldably coupling these enclosures. The appearance may be the same as the related-art cellular phone shown in FIG. 2. In FIG. 1, not shown are the antenna 1, high sensitivity mobile camera 3, positioning mirror 4, an LED (light emitting diode) 5 and subsidiary LCD panel 6. The main LCD panel 2 is included in an LCD module 21 and the key operation portion 9 corresponds to a key matrix 15.

As seen from FIG. 1, the lower enclosure 10 includes a transmission/reception circuit 11, a CPU 12 for communication (hereinafter referred to as C-CPU), an audio processor 13 for processing an audio signal, a memory 14 for communication which is a second memory, a key matrix 15, a key IF (interface circuit) 16, a power source circuit 17. The transmission/reception circuit 11 transmits/receives data and others through an antenna. The CPU 12 executes mainly the processing for a communication function of the cellular telephone. The power source circuit 17 supplies power to the respective components included in the upper enclosure 20 and lower enclosure 10, etc.

The memory 14 includes a volatile memory which is constructed of a static RAM serving as a work memory and others, and a non-volatile memory which is constructed of a flash memory for storing fixed information such as telephone numbers, mail addresses or program. The audio processor 13 may be a DSP (digital signal processor). The transmission/reception circuit 11 is connected to the C-CPU 12 and audio processor 13. The volatile memory may be incorporated in the C-CPU 12.

The function of the audio processor 13 may be given to the C-CPU 12. In this case, the audio processor 13 is not required. Further, the transmission/reception of data and others between the terminal and the outside is executed by wireless through the antenna, but may be executed by wire communication.

The C-CPU 12, audio processor 13 and memory 14 are connected to a first bus line BUS-1. The key matrix 15 is also connected to the first bus line BUS-1 through the key IF 16. The first bus line BUS-1 is connected to a first I/O (input/output) IF 19 through which the data are transferred to/from the upper enclosure 20.

The C-CPU 12 also deal with a key operating signal from the key matrix 15, a calling signal and other control signals, and transmits a necessary signal to the upper enclosure 20. Further, the C-CPU 12 preferably has a function of executing the processing of supplying the image data (e.g. still or static image data) from the upper enclosure 20 to the transmission/reception circuit 11, and transmitting the image data (e.g. still or static image data) received through the transmission/reception circuit 11 to the upper enclosure 20. In the following description, although it is assumed that the image data is the still image data, the still image data may include the image data with less updating frequency (e.g. image updated at a low speed rate of 10 frame/sec or less).

The upper enclosure 20 includes an LCD module 21, a display IF (interface) 22, a camera module 23, a camera IF (interface) 24, a CPU 25 for application (hereinafter referred to as A-CPU), a media processor 26, a memory 27 for application which is a first memory, etc. The LCD module 21 is a display module having a display panel and a driver for the display panel. The camera module 23 is an image pick-up module having a camera and a driver for the camera. The CPU 25 is a first CPU for controlling mainly the function device (application device) such as the LCD module 21 and the camera module 23. The media processor 26 serves a partial function (e.g. image compression processing) including the image processing function of the A-CPU.

The memory 27 includes a volatile memory which is constructed of a static RAM serving as a work memory and others, and a non-volatile memory which is constructed of a flash memory for storing fixed information such as a program. Since the memory 27 serves as the work memory, the image data picked up by the camera module 23 are once stored in the memory 27. The image data stored are subjected to required adjustment as the occasion demands and thereafter read out. The image data thus read are supplied to the LCD module 21 and the lower enclosure 10.

Incidentally, the function of the media processor 26 can be given to the A-CPU 25. In this case, the media processor 26 is not required.

The LCD module 21 is connected to a second bus line BUS-2 through the display IF 22. The camera module 23 is also connected to the second bus line BUS-2 through the camera IF 24. Further, the A-CPU 25, media processor 26 and memory 27 are also connected to the second bus line BUS-2. The second bus line BUS-2 is connected to a second I/O IF 29 through which data are transferred from/to the lower enclosure 10.

The folding portion 30 couples the lower enclosure 10 and the upper enclosure 20 with each other using a plurality of signal wires, there by foldably coupling these enclosures. These signal wires are preferably formed as a wire harness 31.

An explanation will be given of the operation of the foldable cellular telephone shown in FIG. 1. First, in a case where an object is picked up using the camera module 23, by operating the key matrix 23, image pick-up instructing information is supplied to the camera module 23. Then, the camera module 23 start picking up the image. The image pick-up instructing information may be supplied to the camera module 23 through the C-CPU 12 and A-CPU 23 from the key matrix 15, otherwise may be directly supplied to the camera module 23.

The image data picked up by the camera module 23 are once stored in the memory 27. The image data stored are subjected to required adjustment as the occasion demands and thereafter read out. The image data thus read are displayed on the LCD module 21.

The storage of the image data in the memory 27 and the display of the image data on the LCD module 21 are executed under the control by the A-CPU 25. The image data are updated at a high speed rate to a certain degree (e.g. 15 frames/sec) for its monitoring on the LCD module 21.

During the image pick-up by the camera module 23 and image display on the LCD module 21, the processing of the image data updated at a high speed rate is executed only inside the upper enclosure 20 including the A-CPU 25, memory 27, etc. Therefore, the C-CPU 12 is not required to share the processing of the image data.

In this case, unlike the related-art cellular telephone, the folding portion 30 is not required to transfer the image data at a high speed (in real time) from the camera module 23 in the upper enclosure 20 to the CPU in the lower enclosure 10, and from the CPU in the lower enclosure 10 to the camera module 23 in the upper enclosure 20. For this reason, the number of the signal wires of the folding portion 30 can be reduced by adopting e.g. serial communication, thereby downsizing the wire harness 31. Further, the quantity of data passing the wire harness 31 can be greatly reduced, thereby reducing power consumption.

Next, in a case where the image picked up by the camera module 23 and displayed on the LCD module 21 is transferred to a communication party on the other side, when the image to be transferred is displayed on the LCD module 21, image transfer instructing information is supplied to the A-CPU 25 by operating the key matrix 15. Under the control by the A-CPU 25, the image data stored in the memory 27 is first transferred to the side of the lower enclosure 10. In transferring the image data, the image data is preferably subjected to the data reduction processing such as the image compressing processing by the media processor 26 before it is transferred.

On the side of the lower enclosure 10, the image data transferred are transferred to a communication party on the outside from the transmission/reception circuit 11 based on the control C-CPU 12. If the image to be transferred is the still image or image data with less updating frequency, the transfer can be done with less burden.

An explanation will be given of the case where a user plays a game while seeing the screen of the LCD module 21. The data necessary for playing the game are previously stored in the memory 27. Therefore, from the lower enclosure 10, by operating the key matrix 15, a command signal is supplied to the A-CPU 25 through the folding portion 30. In accordance with the command signal, the A-CPU 25 reads the program data or other data stored in the memory 27, and controls the image display on the LCD module 21 on the basis of the data thus read.

In this way, in the case of playing the game, the high-speed data processing and the high-speed data transfer on the basis of the processed date are carried out only inside the upper enclosure 20. Thus, also in the case of playing the game, the quantity of data passing the folding portion and its bus line width can be extremely reduced.

In a case where the communication data containing the image data are transferred from the communicating party on the outside, first, the transmission/reception circuit 11 receives the communication data. Then, the C-CPU 12 and audio processor 13 processes the communication data thus received. The fact that the communication data containing the image data have been received is reported to the A-CPU 25 through the folding portion 30. Simultaneously, the received image data, after compression processed, are transferred to the A-CPU 25 through the folding portion 30. The image thus received is displayed on the LCD module 21. The image received is also a still image or the image with less updating frequency.

As understood from the above description, the data transferred between the lower enclosure 10 and the upper enclosure 20 are, in both transfer directions, the still image data or compressed image data, key entry signals and other control signals. For this reason, unlike the related-art cellarphone, it is not necessary to transfer, through the wire harness 31 of the folding portion 31, the image (picked-up image or game image) updated at a high-speed rate for monitoring. Thus, the power consumption will not be increased owing to the capacitive load of the wire harness 31 of the folding portion 30. The number of components for noise countermeasure can also be reduced. Only when the image data containing the sill image is transferred between the lower enclosure 10 and the upper enclosure 20, the data transfer can be executed between the lower enclosure 10 and the upper enclosure 20. Thus, the transmission/reception and display of the image data and other data can be done surely with no hindrance.

In the description hitherto made, the operation of the LED display and subsidiary LCD panel was not explained. In their operation, however, in response to e.g. telephone calling, a small quantity of data such as calling or mail receiving information, date, time, etc., is only transferred at a low speed. This is not problematic at the folding portion 31.

In the embodiment, the display panel was constructed of the LCD display panel. However, the portable communication terminal according to the present invention can be also designed using the other display device such as an organic E/L display panel. Further, the present invention can be applied to not only the folding structure described in connection with the embodiment but also a structure in which the lower enclosure and upper enclosure are revolved.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A portable communication terminal comprising:
    a first enclosure including a function device for compression processing an image data, a first CPU for controlling said function device, a first memory controlled by said first CPU, a first bus line connecting said function device, said first CPU, and said first memory, a first interface connected to said first bus line and receiving compression processed image data processed by said function device, and a display for displaying the data processed by the function device;
    a second enclosure mechanically and electrically connected to the first enclosure, the second enclosure including a transmission/reception circuit for performing communication between the terminal and the outside, a second CPU for controlling said transmission/reception circuit and compression processing image data from the transmission/reception circuit, a second interface which receives the compressed image data from the second CPU, and a second memory controlled by said second CPU, wherein the display also displays the information obtained from the transmission/reception circuit; and
    a coupling portion for coupling said first enclosure and said second enclosure mechanically and electrically, said coupling portion connecting said first and second interface and including a signal wire transmitting and receiving compression processed image data between said first and second interface, wherein said first enclosure and said second enclosure are foldably coupled with each other at a folding portion.

2. A portable communication terminal according to claim 1, wherein said image data is subject to image compression processing before data transmission/reception containing said image data is carried out between said first enclosure and said second enclosure.

3. A portable communication terminal according to claim 1, wherein when the communication is carried out between the terminal and the outside, data transmission/reception containing said image data is enabled between said first enclosure and said second enclosure.

4. A portable communication terminal according to claim 1, wherein said function device includes a camera module and a display module.

5. A portable communication terminal according to claim 1, wherein
    in said first enclosure, said function device, said first CPU and said first memory are coupled with one another through a first bus line;
    in said second enclosure, said second CPU and said second memory are coupled with each other through a second bus line; and
    data transmission/reception between said first enclosure and said second enclosure is carried out between said first bus line and said second bus line through an input/output interface.

6. A portable communication terminal according to claim 1, wherein said first enclosure includes a media processor for serving a partial function including an image processing function of said first CPU.

7. A portable communication terminal according to claim 6, wherein
    in said first enclosure, said function device, said first CPU, said media processor and said first memory are coupled with one another through the first bus line;
    in said second enclosure, said second CPU and said second memory are coupled with each other through the second bus line;
    data transmission/reception between said first enclosure and said second enclosure is carried out between said first bus line and said second, bus line through an input/output interface.

* * * * *